Oct. 27, 1925.
P. B. DELANY
ELECTROCHEMICAL RECORDER
Filed Feb. 8, 1922
1,558,536
2 Sheets-Sheet 2
Fig. 10.
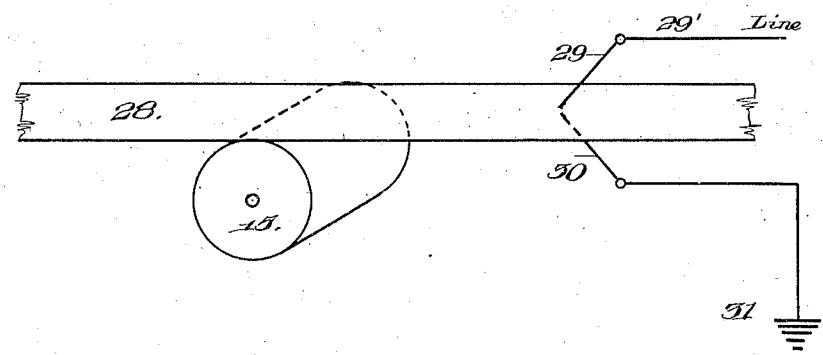
Fig. 11.
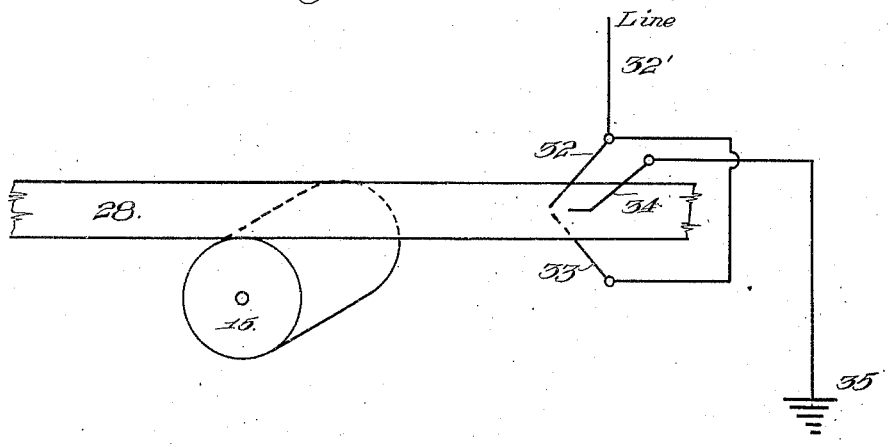
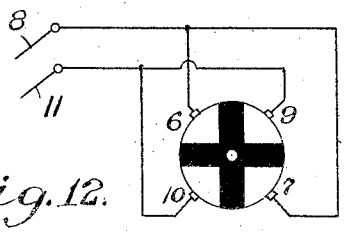
Fig. 12.
INVENTOR.
Patrick B. Delany,
by his Attorneys,
Baldwin Wight Patented Oct. 27, 1925.

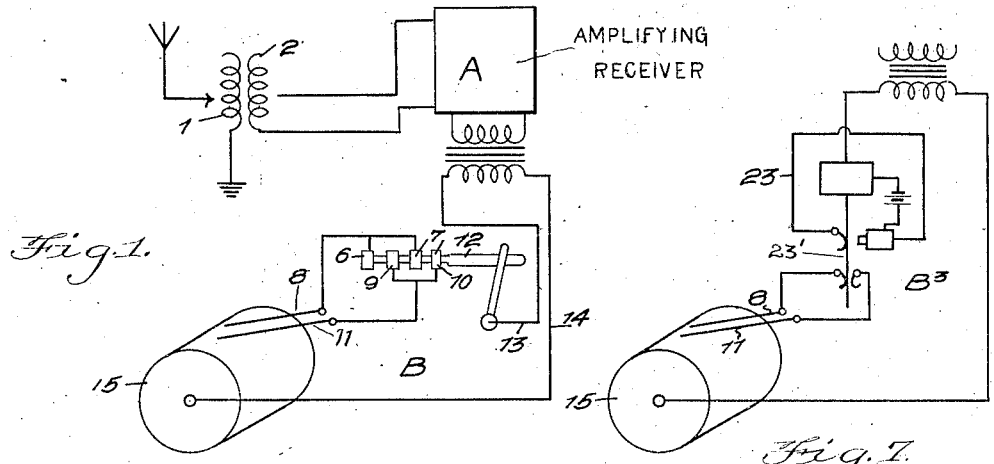
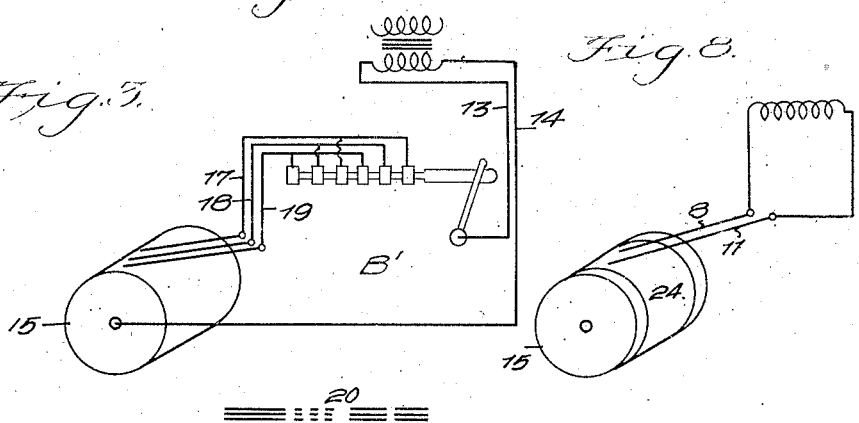
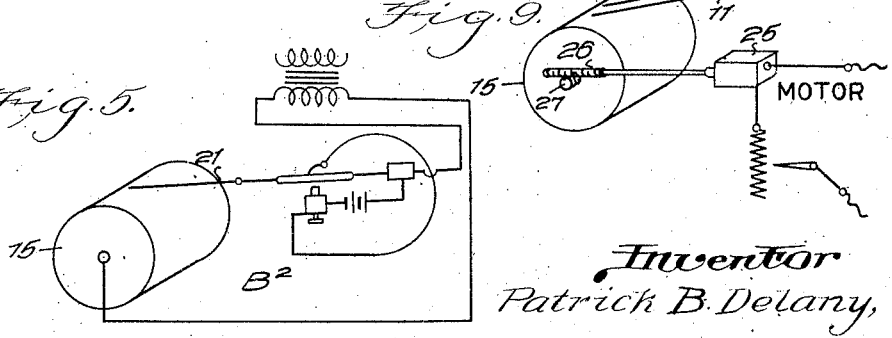

1,558,536

UNITED STATES PATENT OFFICE.

PATRICK B. DELANY, OF SOUTH ORANGE, NEW JERSEY, ASSIGNOR, BY MESNE ASSIGNMENTS, TO INTERNATIONAL TELEPOST COMPANY, INC., A CORPORATION OF DELAWARE.

ELECTROCHEMICAL RECORDER.

Application filed February 8, 1922. Serial No. 535,055.

*To all whom it may concern:*

Be it known that I, PATRICK B. DELANY, a citizen of the United States, residing at South Orange, in the county of Essex and the State of New Jersey, have invented an Improvement in Electrochemical Recorders, of which the following is a full, clear, and exact description.

The invention, while applicable to wire telegraphy is more especially adapted to record wireless signals which require for effective operation the most efficient use of the weak currents of these systems that are available at the receiving station.

It has been found in operation that the use of a recording wire of sufficient cross section diffuses the electro-chemical decomposition over a surface which renders the record too faint for ready deciphering, while the record from a small wire, though of greater density, is equally difficult of transcription, owing to its fineness, and in addition has the disadvantage of instability.

One object of my invention is to effect maximum electro-chemical action at the recorder, and I obtain this by two or more closely mounted recording fingers, each alternately connected to the receiving circuit so that the combined record forms practically a single line.

Another object of my invention is to provide a very plain record by the use of a laterally vibrating recording wire which produces a wavy or zig-zag line in black outline that greatly facilitates transcription.

Another object of my invention is to produce a record with two or more parallel lines, and this is brought about by the use of a rapidly revolving switch which alternately transfers the circuit from one recording wire to another at such a speed relative to the speed of movement of the tape, that there is formed substantially a continuous line in the track of each wire.

Another object of the invention is the production of a very clear record by the use of a metallic band or contact underneath the tape unconnected with any part of the circuit except as a path for the current from one recording wire to the others supplementary to the chemical tape itself.

Other objects will be apparent from the following detailed description and the appended claims.

In the drawings, which are diagrammatic in character:

Figure 1 shows a usual sending apparatus and at the receiving station a chemical recorder with two fingers and a rotating switch.

Figure 2 shows the record produced thereby.

Figure 3 shows a receiving apparatus employing three contact fingers.

Figure 4 shows the record produced thereby.

Figure 5 shows a receiving apparatus using a single recording finger which is given a rapid lateral vibration.

Figure 6 shows the record produced thereby.

Figure 7 shows a system similar to the receiving apparatus of Figure 1, but employing a rapidly vibrating reed instead of the rotary switch.

Figure 8 shows a receiving apparatus in which a disconnected metal band underlies the tape.

Figure 9 shows conventionally means for regulating the speed of the moving tape.

Figure 10 is a diagrammatic view of a modification employing two recording fingers, one bearing on each surface of the tape.

Figure 11 is a similar view of a modification in which three fingers are provided, the third one being of non-recording metal and connected to the ground or return circuit.

Figure 12 is an end view of the conventional rotary switch mechanism illustrated diagrammatically in Figure 3.

In Figure 1 is illustrated a conventional wireless apparatus comprising the usual induction coils or transformer 1, 2, connected to an amplifying receiver A, which may be of any usual type and is diagrammatically illustrated. In the same figure B designates the receiving apparatus as a whole. This comprises a rotary switch of the usual type, diagrammatically illustrated as having segments 6, 7, 9 and 10 and the usual finger or brush 12 connected to one terminal 13 of the receiving circuit. The other terminal 14 is connected to a drum 15 in the usual manner. The segments 6 and 7 are connected to a finger 8 and the segments 9 and 10 are connected to a finger 11, these fingers resting on a chemically prepared tape passing around or over the drum 15 in the usual manner.

The rotary switch is adapted to be rotated at any desirable speed, and the current will be caused to pass alternately through the recording fingers 8 and 11. The brush 12 is of a size so that when it passes from one segment to another, it will close the circuit through both fingers momentarily. The speed of the switch is regulated with reference to the speed of the movement of the tape so that a plurality of impulses will be caused to lap in each signal, thereby increasing the electro-chemical decomposition and the consequent legibility of the record. The form of record obtained by this device is shown at 16 in Figure 2. The two lines will be close together and each will be more legible than the single line formerly obtained by a single finger, so that the clearness of the record is increased in two ways.

Figure 3 shows a form of receiving apparatus B' in which the rotary switch connects the recording fingers to the line successively in 1, 2, 3 order, the wires to the fingers being designated 17, 18 and 19. The form of record produced is shown in Figure 4. In all other respects the construction and operation is the same as that of the form shown in Figure 1.

A further modified form of receiving apparatus is shown at B² in Figure 5. In this case a single finger 21 is employed, but by means of any usual or desired make-and-break device it is rapidly oscillated transversely for a distance of $\frac{1}{64}$ of an inch, for example. This will give a record such as designated 22 in Figure 6, which is very legible.

A still further modification B³ is illustrated in Figure 7 where the circuit 23 is led alternately to fingers 8 and 11 of the type shown in Figure 1 by means of a rapidly vibrating reed 23' given its vibration in any well known manner. This vibrating reed is used as an alternative to the rotary switch of Figure 1 and the record produced is substantially the same and is shown in Figure 2.

A detail improvement is shown in Figure 8 and is adapted to be used with any of the above described forms of receiving apparatus. It comprises the employment of a metallic band 24 around the drum 15 which is not directly connected with any part of the circuit. The tape passes between the fingers and the metallic band. The tape alone would suffice as a conductor between the fingers but by the metallic contact underneath the resistance of the tape is reduced. I find that this is much preferable to the use of a metallic electrode underneath the tape.

In Figure 9 is conveniently illustrated a motor 25 which is connected through a worm 26 and worm gear 27 to rotate the drum 15. Through an adjustable resistance or in any other suitable manner the speed of the drum is regulated. This may be used with any of the forms of receiving apparatus illustrated. The means for regulating the speed of the tape as well as the usual regulating means for the speed of the rotary switch enable the relative rates to be so chosen that a plurality of impulses will be given in each signal as mentioned above, and forms an important feature of my invention.

In Figure 10 I show a variation of my invention in which a chemical tape 28 passes over the drum 15, and two fingers 29 and 30 bear on opposite sides of the tapes opposing each other. With this arrangement, signals of either polarity would be recorded, positive currents on one side of the tape and negative currents on the other side. The finger 29 is connected through 29' to the line and the finger 30 is grounded at 31.

Figure 11 illustrates a still further modification in which two fingers 32 and 33, similar to fingers 29 and 30 in Figure 10, are employed, and in addition thereto, a third finger 34 which is of non-recording metal and grounded at 35. Both of the fingers 32 and 33 are connected to the line. By this method a double record is made, each contributing to the density of the other.

It is obvious that my invention is independent of the particular form of certain details which have therefore been illustrated only conveniently. It is immaterial just how the impulses are produced at the recorder, or how the rotary switch is rotated or how its speed is controlled; how the finger 21 is given its lateral vibration or the reed 23' is oscillated; or how the drum 15 is given its rotation. Any old or desirable means may be employed to effect these movements, as my invention is independent thereof, but resides in the features hereinafter claimed.

I claim as my invention:

1. An electro-chemical recorder comprising a receiving circuit, a plurality of recording fingers, a switch in said circuit, and means controlled by the switch for alternately connecting the recording fingers to the receiving circuit.

2. An electro-chemical recorder for signals composed of interrupted currents of like polarity comprising a receiving circuit, a rotary switch in said circuit, a plurality of recording fingers, and means whereby the rotation of the switch alternately connects the recording fingers to the receiving circuit.

3. An electro-chemical recorder comprising a receiving circuit, a plurality of recording fingers adapted to make a record on a chemical tape, and means for connecting said fingers individually and jointly to said circuit.

4. An electro-chemical recorder comprising a receiving circuit, means for feeding a chemical tape, a plurality of recording fingers bearing on the tape, a rotary switch in said circuit, and means controlled by said switch for connecting said fingers individually and jointly to said circuit.

5. An electro-chemical recorder comprising a receiving circuit, means for feeding a chemical tape, a plurality of recording fingers in contact with said tape, and means for connecting the recording fingers to said circuit successively.

6. An electro-chemical recorder comprising a receiving circuit, means for feeding a chemical tape, a recording finger bearing on said tape, and means for regulating the speed of the tape to the frequency rate of the currents in the circuit to record in unbroken elements of telegraphic characters.

7. An electro-chemical recorder comprising means for feeding a chemical tape, a plurality of recording fingers resting upon said tape and a disconnected metal plate in contact with the tape on the side opposite to the fingers.

8. An electro-chemical recorder comprising means for feeding a tape over a drum, a metal plate carried by the drum but not electrically connected therewith upon which the tape rests, and a plurality of recording fingers resting upon the tape on the other side thereof and opposed to said plate.

9. An electro-chemical recorder comprising a receiving circuit, a plurality of recording fingers, a switch in said circuit, means controlled by the switch for alternately connecting the recording fingers to the receiving circuit, and means for regulating the speed of movement of the switch to cause a finger to be connected to the circuit a plurality of times in each signal.

10. A method for electro-chemically recording impulses comprising the superposition in part of a plurality of said impulses to form unbroken dot and dash characters.

11. A method for electro-chemically recording upon a chemical tape impulses forming component parts of characters which comprises regulating the speed of the tape with relation to the rate of the impulses to cause an overlapping of the impulses on the tape and thereby produce increased electrolytic action.

12. A method for electro-chemically recording upon a chemical tape dots and dashes comprising a plurality of impulses comprising regulating the frequency of interruption of the impulses forming said dots and dashes, and regulating the speed of movement of the chemical tape in relation thereto, thereby causing a superposition in part of the impulses and the formation of unbroken dot and dash characters.

13. An electro-chemical recorder comprising a chemical tape, two recording fingers contacting with the tape on opposite sides and both connected to the receiving circuit, and a third finger contacting with said tape and connected to the return circuit or grounded.

In testimony whereof, I have hereunto subscribed my name.

PATRICK B. DELANY.